J. DE LIPKOWSKI.
REPEATING ACCELERATOR FOR COMPRESSED AIR BRAKES.
APPLICATION FILED JAN. 5, 1918.
Patented July 30, 1918.
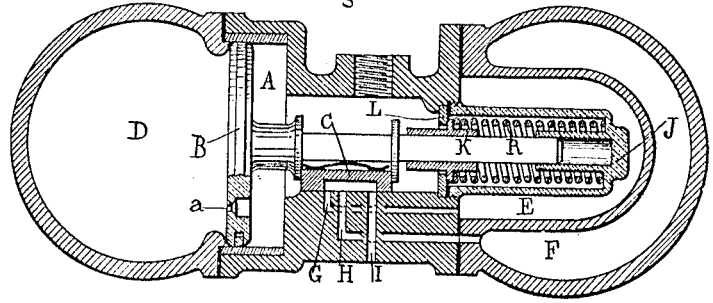
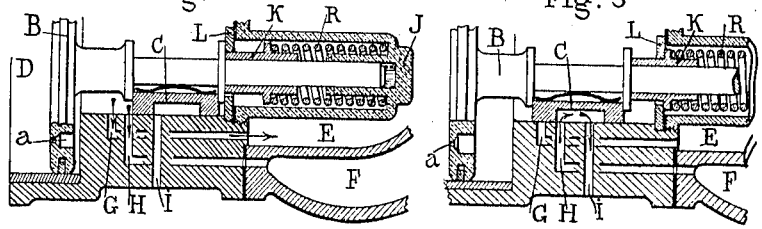
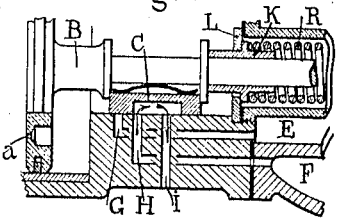
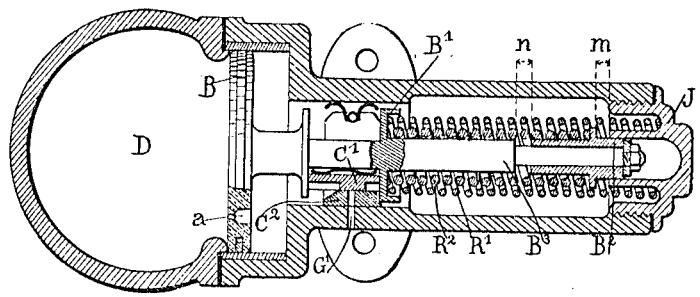
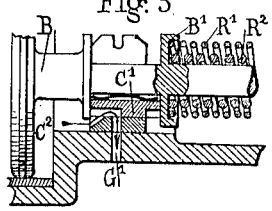
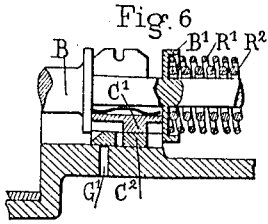
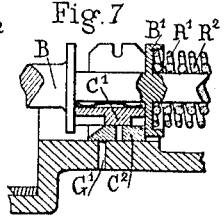
INVENTOR
JOSEPH de LIPKOWSKI J. DE LIPKOWSKI.
REPEATING ACCELERATOR FOR COMPRESSED AIR BRAKES.
APPLICATION FILED JAN. 5, 1918.
1,274,290.
Patented July 30, 1918.
2 SHEETS—SHEET 2.
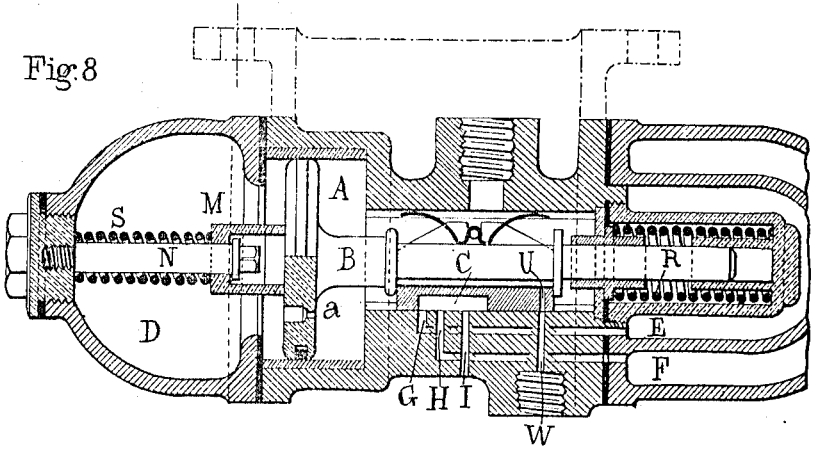
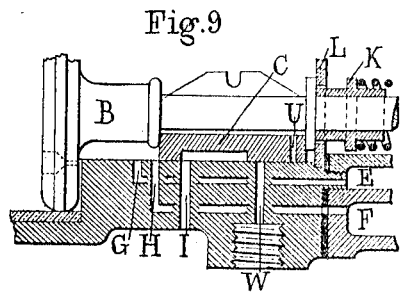
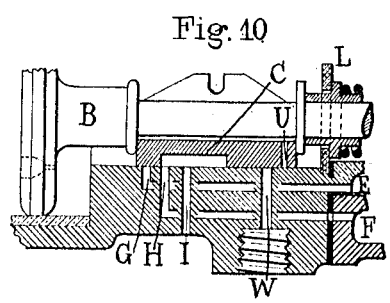
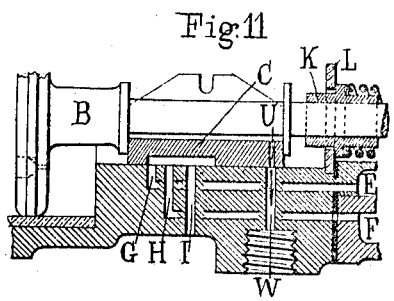
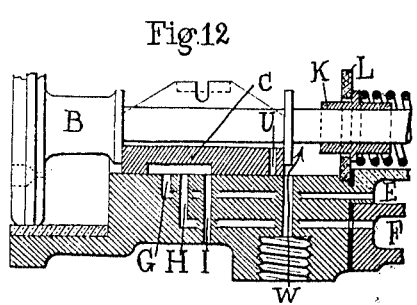
INVENTOR
JOSEPH de LIPKOWSKI
BY
his ATTORNEYS

UNITED STATES PATENT OFFICE.

JOSEPH DE LIPKOWSKI, OF PARIS, FRANCE.

REPEATING ACCELERATOR FOR COMPRESSED-AIR BRAKES.

1,274,290. Specification of Letters Patent. Patented July 30, 1918.

Application filed January 5, 1918. Serial No. 210,508.

*To all whom it may concern:*

Be it known that I, JOSEPH DE LIPKOWSKI, a Polish citizen, engineer, and a resident of 11 Rue Claude Chahu, Paris, France, have invented new and useful Improvements in Repeating Accelerators for Compressed-Air Brakes, of which the following is a specification.

This invention relates to a repeating accelerator for compressed-air brakes for railway vehicles and for other purposes and is characterized by this fact that it acts for the first ordinary application of the brakes and for each of the successive partial applications which the driver or operator wishes to produce, in order to increase the braking effort. Further, it produces for the first partial application of the brakes a fall in pressure in the main pipe or train pipe which is perceptibly greater than that for the following complementary applications of the brakes.

In the annexed drawings:

Figure 1 is an axial section of the apparatus, showing the position of the slide-valve of the accelerator at rest.

Figs. 2 and 3 show different positions of the slide-valve, during the working of the accelerator.

Fig. 4 is a modification of the apparatus, in the position of rest.

Figs. 5, 6 and 7 show different positions of the slide-valve, during the working of the accelerator.

Figs. 8 to 12 relate to another modification of the apparatus, which allow of accelerating the release.

Fig. 8 is an axial section of the apparatus, in its position of rest.

Figs. 9, 10, 11 and 12 show different positions of the slide-valve during the application and the release of the brakes.

The apparatus shown in Fig. 1 comprises essentially a central breech or cylinder A which continuously communicates with the train pipe. In this cylinder A is arranged a piston B which moves a plain slide valve C. On the outer side of this piston is a compressed air-chamber D. On the opposite side is fixed a reservoir with two separate chambers E and F. The passages G and H place the reservoirs E and F, according to the position of the slide valve, in communication with either the train pipe or the vent or exhaust pipe I.

Fig. 1 shows the respective position of the parts during the travel of the train. The compressed air from the train pipe arrives in the cylinder A, drives the piston B to the end of its stroke to the left, this position being illustrated in Fig. 1, and passes through the small orifice $a$ into the chamber D. The slide valve C then establishes direct communication between the two reservoirs E and F, and the atmosphere, by the passages G, H and I.

When the operator opens the control cock to effect the braking operation, the pressure in the train pipe commences to fall and there occurs a moment when the decrease in pressure is sufficiently great for the air in chamber D, which has not been able to pass in sufficient quantity into the train pipe, by reason of the small section of the opening $a$, to be able to move the piston to the right, thereby compressing the recall-spring R, arranged around the rod of the piston B between the rear wall of the cover J and a flange of the sleeve K, which surrounds said rod of piston B and which abuts against a fixed wall L. The slide valve then assumes the position indicated in Fig. 2 and uncovers the two passages G and H.

The compressed air from the train pipe rushes into the discharge reservoirs E and F. The result is a rapid fall in pressure which causes the working of the following accelerator and strikes back by successive pulsations, from one accelerator to another, the whole length of the train.

The decrease in pressure is caused by the expansion which the air in the pipe undergoes, after having filled the two discharge reservoirs; it depends then solely on the respective volume of the pipe and of the reservoirs E and F.

After acceleration has operated, the compressed air, inclosed in the chamber D, continues to pass into the train pipe by the orifice $a$; there occurs then a moment when the pressures are equalized and the spring R brings back the piston to the left, acting upon the sleeve K. However, the piston B does not come back to the bottom of its stroke because the sleeve K has been stopped on the way by the fixed wall L.

The slide valve then occupies the position shown in Fig. 3. In this position, the wall of the slide valve uncovers only the passage H while the passage G remains closed by the solid wall of the slide valve. The result is that the reservoir F is alone emptied while the reservoir E retains the compressed air which it had received.

The apparatus is now ready to recommence working and to effect a new acceleration, but for this second operation as well as for all the following accelerations, the train pipe will be able to discharge only into a single reservoir F.

The fall in pressure produced by the second acceleration will, therefore, be weaker than for the first.

All the following accelerations will take place in the same conditions as the second.

On the other hand, the pressure in the train pipe diminishes after each acceleration and as the expansion which the compressed air undergoes each time is a constant fraction of this pressure, it follows that successive falls in pressure made by the subsequent accelerations will proceed in a progressively diminishing manner.

At the time of slackening or releasing the brakes, the compressed air which the operator admits into the train pipe, pushes back the piston B to the left, to the end of its stroke, and replaces the parts in the working position shown in Fig. 1. The slide valve C then empties the reservoir E which remained filled with air after the first acceleration. The apparatus is then ready to recommence working in the conditions described.

Fig. 4 shows a modification of the accelerator, in which the fall of pressure in the train pipe is obtained by allowing the compressed air from the pipe to vent or escape directly into atmosphere, and by stopping this escape when the fall in pressure obtained has reached a limit determined in advance and regulated by springs.

Fig. 4 shows the arrangement of the parts at rest. As in the preceding accelerator, there is a piston B and a chamber D which latter is filled with air by means of a small orifice $a$. The slide valve has been duplicated, that is to say there are two slide valves $C^1$ and $C^2$, of which one slides upon the surface of the apparatus and the other upon the first slide valve. As soon as the operator has caused in the train pipe a sufficient fall in pressure to overcome the resistance of the spring $R^1$ arranged around the rod of the piston B, between the rear wall of the cover J and a plate $B^1$ integral with said rod, the piston B moves to the right, carrying with it at first the small slide valve $C^1$ alone, while the slide valve $C^2$ remains in place. The piston stops when the sleeve $B^2$, surrounding the end of the rod of piston B, abuts, by means of its external flange, against the central tube of the cover J. This first stroke is indicated by the letter $m$. At this moment the slide-valves occupy the respective positions shown in Fig. 5. The small slide valve $C^1$ has uncovered the central aperture of the slide valve $C^2$ and air from the pipe escapes into the atmosphere through the pipe or passage $G^1$. When the fall in pressure produced in the train pipe has become sufficient to overcome the resistance of the second spring $R^2$, surrounding the rod of piston B, between the plate $B^1$ and the external flange of the sleeve $B^2$, the piston resumes its stroke to the right, this time carrying with it the two slide valves. This second stroke, indicated by the letter $n$, finishes when the projection $B^3$ of the rod of the piston bears against the sleeve $B^2$. In this new position, Fig. 6, the escape is stopped because the slide valve $C^2$ has closed the escape outlet $G^1$.

The degree of the reduction in pressure produced in the train pipe, thus depends on the combined strength of the springs $R^1$ and $R^2$.

When acceleration takes place, the compressed air in chamber D continues to pass into the train pipe by the orifice $a$ and when the pressure commences to be balanced, the springs $R^1$ and $R^2$ will bring back the piston to the left.

Fig. 7 indicates the intermediate position of the return movement, which position corresponds with the moment when the spring $R^2$ has ceased to act. At this moment, the vent or escape remains closed because the slide valve $C^2$ has not yet moved.

Afterward it is the spring $R^1$ which alone will continue to bring back the piston to the left, but the escape will remain constantly closed because the slide valve $C^1$ will have again covered the central aperture of the slide valve $C^2$, as shown in Fig. 4.

The parts having returned automatically to the working position, the apparatus is ready to work again and to produce a new acceleration. Each time, it will produce a fall in pressure of a constant degree and determined by the strength of the springs $R^1$ and $R^2$.

The modification shown in Figs. 8 to 12 allows of insuring acceleration for the complete release of the brakes, without harmfully affecting the controllability of the brakes at release. This acceleration is obtained by putting, at the beginning of the complete release, the train pipe in communication with a reservoir of compressed air, which has retained its pressure while the air of the train pipe had undergone the necessary expansion to produce the application of the brakes; this air under pressure enters into the train pipe and there produces a rapid increase of pressure, and this causes the working of the following accelerator and so on along the pipe under each vehicle which thus fills itself with air, and not only by means of the cock controlled by the operator, as would take place in ordinary conditions.

The apparatus (Fig. 8) differs from that of Fig. 1 only by the addition of a little compressed-air reservoir (not shown), which is put in communication with the train-pipe by means of the opening W when the latter is uncovered by the slide-valve; in addition a release stop M, maintained by a spring S which is guided by a rod N in the compressed-air chamber D, acts on the piston B. This stop arrests the piston as soon as the operator relaxes the braking efforts without wishing to cause complete release. In this case, the small quantities of air which he admits into the train pipe have not sufficient force to overcome the resistance of the spring S, because this air has time to enter into the chamber D by the small orifice $a$ of the piston B and to reestablish equality of pressure on each of the two faces of the piston.

But as soon as the operator wishes to effect a rapid release of the brakes, the air which he has admitted into the train pipe by the large orifice of the controlling cock, pushes back to the left the piston B of the first accelerator, while compressing the spring S. The slide valve then occupies the position indicated in Fig. 12 and uncovers the opening W. The compressed air from the small reservoir thereupon abruptly enters the train pipe and causes the working of the following accelerator and so on throughout the whole length of the train.

When the pressures are balanced on the two faces of the piston B, by reason of the small orifice $a$, the spring S brings back the piston into the working position shown in Figs. 8 and 11. In this position, the small passage U pierced in the slide valve insures the feed of the reservoir by the port W.

The strength of the spring S is so arranged that acceleration at release is produced only in case the operator wishes to obtain the complete release, while for all progressive or partial releases, the accelerator does not intervene.

This acceleration at release is obtained without any expenditure of compressed air, because the compressed air which passes from the reservoirs through the ports W into the train pipe, replaces that which the operator would ordinarily have sent into the pipe by the controlling cock. The rapidity of the release is due to the fact that the train pipe is supplied by all the reservoirs of the accelerators distributed along the train, in place of being filled through the single orifice of the control cock.

The sudden increase of pressure, produced in the train pipe by the first accelerator, causes the working of the following accelerator and thus spreads with great rapidity from one apparatus to the other along the whole length of the train.

For partial or progressive releases, the accelerators do not operate, so as not to compromise the controllability of the brakes at the time of release.

Claims:

1. In an accelerator for compressed air-brakes, means for repeating the working of said accelerator at each partial successive application of the brakes and means for affording automatically, for the first application of the brakes, a fall of pressure in the train pipe greater than for the following complementary applications which progressively diminish in intensity.

2. In an accelerator for compressed air-brakes, means for repeating the working of said accelerator at each partial successive application of the brakes and means for producing always the same relative fall of pressure in the train-pipe at each successive partial application.

3. In an accelerator for compressed air-brakes, means for repeating the working of said accelerator at each partial successive application of the brakes, means for affording automatically, for the first application of the brakes, a fall of pressure in the train pipe greater than for the following complementary applications which progressively diminish in intensity, and means for accelerating the release of the brakes by causing to pass, at this moment, into the train pipe, compressed air contained in a separate reservoir, arranged under each vehicle and which had retained the whole of its pressure while the air in the train pipe has undergone the decrease of pressure necessary to insure the application of the brakes.

In testimony whereof I have signed my name to this specification, in the presence of two subscribing witnesses.

JOSEPH DE LIPKOWSKI.

Witnesses:
  MAX DE QUEREIZE,
  CAMILLE BARIL.